Oct. 13, 1970

T. GIZESKI 3,533,595

VALVE OPERATOR

Filed July 19, 1968

INVENTOR.
Terrence Gizeski,
BY
Hume, Groen, Clement & Hume
Attorneys.

United States Patent Office 3,533,595
Patented Oct. 13, 1970

3,533,595
VALVE OPERATOR
Terrence Gizeski, Chicago, Ill., assignor to Ferguson, Hille & Associates, Inc., Chicago, Ill., a corporation of Illinois
Continuation-in-part of application Ser. No. 490,804, Sept. 28, 1965. This application July 19, 1968, Ser. No. 746,018
Int. Cl. F16k 31/04
U.S. Cl. 251—14
7 Claims

ABSTRACT OF THE DISCLOSURE

A valve operator includes an electric motor for axially displacing a valve and associated stem between first and second positions relative to a valve seat. A piston and cylinder arrangement cooperates with the remaining operator mechanism to effect a cushioned seating of the valve as the motor drives the valve into engagement with its seat, the cushioning effect occurring by virtue of displacement of the piston against a spring or the like within the cylinder. In another embodiment, the motor is stopped short of full seating of the valve and a fluid is introduced into the cylinder to displace the piston relative to the cylinder and thereby effect a final seating of the valve at a preselected seating pressure; an opposite relative movement of the piston unseats the valve. Other features and embodiments are disclosed.

CROSS-REFERENCE TO RELATED APPLICATION

This is a continuation-in-part of co-pending application Ser. No. 490,804, filed Sept. 28, 1965, now abandoned and entitled "Valve Operator."

INTRODUCTION

This invention relates to apparatus for operating a valve and, more particularly, to a valve operator for exercising a predetermined control over the seating and unseating of a valve member.

SUMMARY OF THE INVENTION

It is an object of the present invention to provide apparatus for opening and closing a valve.

It is another object to provide apparatus for controlling the open position of the valve.

It is a further object to provide apparatus for opening and closing a stem type valve which will provide a positive tight shut-off of the valve.

It is still a further object to provide apparatus for opening and closing a stem type valve which will provide a positive tight shut-off for the valve and positively hold the valve in this shut-off position.

It is still another object to provide apparatus for opening and closing a stem type valve wherein supplemental torque may be provided as said valve is being opened from its closed position.

It is another object to provide apparatus for finely controlling the open position of a valve.

BRIEF DESCRIPTION OF THE DRAWINGS

The invention, both as to its organization and method of operation, taken with further objects and advantages thereof, will best be understood by reference to the following description taken in connection with the accompanying drawings, in which.

DESCRIPTION OF THE PREFERRED EMBODIMENTS

Figures 1, 2:
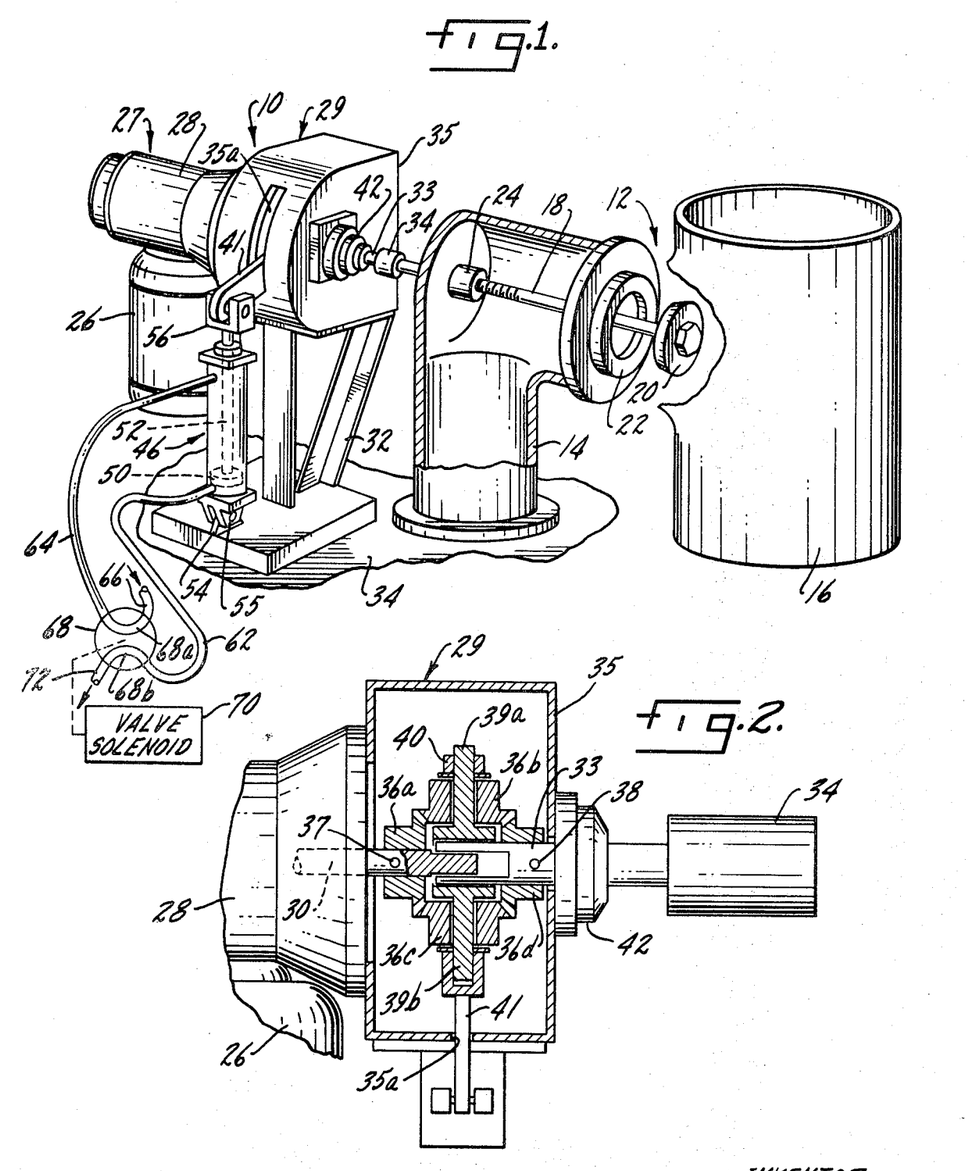
FIG. 1 is a perspective view of a valve operator embodying the features of the present invention, including a schematic diagram of the pneumatic system associated with said valve operator.
FIG. 2 is a fragmentary cross-sectional top view of the valve operator of FIG. 1.

Referring to the drawings, and more particularly to FIGS. 1 and 2, the valve operator of the present invention is indicated generally by reference numeral 10. As shown in FIG. 1, the valve operator 10 is to effect the opening and closing of a valve 12 in a branch pipe 14 from a main pipe 16. To these ends the valve operator 10 is connected to a valve stem 18 of the valve 12. A valve disc 20 attached to a free end of the valve stem 18 cooperates with a valve seat 22 to allow or prevent flow through the pipe 14 to or from the pipe 16. A collar 24 is secured to the pipe 14, the valve stem 18 threadably engaging the collar 24 whereby rotation of the stem 18 moves the valve disc 20 toward or away from the valve seat 22 to open or close the valve 12.

The valve operator 10 includes a gear motor indicated generally by reference numeral 27 and a differential gear unit 29. The selection of a suitable gear motor 27 would be within the ordinary skill of one in the art. In this instance, however, the gear motor 27 comprises a three-phase alternating current motor 26, a gear box 28 and a drive shaft 30 (see FIG. 2) and is a right-angle gear motor of the type manufactured and sold by Master Electric Company and illustrated in their Consolidated Price List (Data 56, dated June 1955) entitled "Gearmotors—Right Angle Shaft Type." Such gear motors, as is well known in the art, employ worm gearing in the gear box 28 whereby the drive shaft 30 is "self-locking," i.e., the drive shaft 30 may drive the differential gear unit 29 and the valve stem 18, but the differential gear unit 29 or the valve stem 18 may not be used to rotate the drive shaft 30. Therefore the drive shaft 30 of the gear motor 27 does not rotate unless driven by the electric motor 26 through the gear box 28.

The electric motor 26 has braking means (not shown), as will be readily appreciated by one with ordinary skill in the art. The brake means is of the type employed on the "Unibrake Motor" manufactured and sold by the Master Electric Company and described and illustrated in their Consolidated Price List (Data 53, dated June 1955) entitled "Unibrake Motors." This type of brake means is further illustrated, with a parts list, in Master Electric Company's File Parts Catalogue, "Parts List for Single Disc Unibrake-Open Ventilated Type," pp. 1–3, dated Jan. 2, 1957. The gear box 28 and alternating current motor 26 cooperate to drive the shaft 30.

The gear motor 27 is attached by bolts (not shown) or the like to the differential gear unit 29 which, in turn, is fixedly mounted upon a base 32 which is fastened to a floor 34 or the like. The differential gear unit 29 has a driven shaft 33 which is fixedly secured to the valve stem 18 by a suitable coupling 33a which precludes relative rotation between the stem 18 and the shaft 33, but permits relative axial movement between the shaft 33 and the stem 18. In this manner upon rotation of the driven shaft 33 and the valve stem 18 will rotate in the same direction and the same number of revolutions as the driven shaft 33 and move the valve disc 20 axially away from or toward the valve seat 22 depending upon the direction of rotation of the shaft 33. It will be understood that the driven shaft 33 and the drive shaft 30 do not move axially.

The differential gear unit 29 is a conventional type well known in the art. Within a housing 35 a bevel gear 36a, which is fixedly mounted upon the drive shaft 30 by a pin 37 or the like, meshes with spider bevel gears 36b and 36c which in turn mesh with bevel gear 36d fixedly mounted upon the driven shaft 33 by a pin 38 or the like. The bevel gears 36b and 36c are rotatably mounted upon spider members 39a and 39b, respectively, which are attached to a yoke member 40 having a reaction arm 41 extending outwardly of an opening 35a in the housing 35 of the differential gear unit 29. The driven shaft 33 extends through self-alignment bearings 42 mounted on the housing 35.

A pneumatic reaction cylinder 46 is connected to the reaction arm 41. The pneumatic reaction cylinder 46 has a reciprocal piston 50 therein connected to a piston shaft 52 which extends outwardly of one end of the cylinder 46. The shaft 52 has a yoke 56 attached thereto which is pivotally attached to the reaction arm 41. The other end of the reaction cylinder 46 has a yoke 55 attached thereto which is pivotally secured to a support member 54 on the frame 32. In this manner as the piston 50 and shaft 52 move the cylinder 46 may pivot about the pivotal attachment between the yoke 55 and the support member 54.

The reaction arm 41 is rotatable about the axes of the shafts 30 and 33. When so rotated by the reaction cylinder 46 it will cause the shaft 33 to rotate relative to the shaft 30 because the latter is locked in place. Rotation of the reaction arm 41 is effected by the reaction cylinder 46 and the movement of the piston 50 therein. To these ends pressurized fluid, such as air, oil or the like, is selectively supplied to the reaction cylinder 46 through a supply line 66. A valve 68, controlled by a valve solenoid 70, controls the flow of fluid from the line 66 to lines 62 or 64 which communicate with opposite ends of the cylinder 46. The valve 68, which is illustrated schematically in FIG. 1, has passageways 68a and 68b therein. In the position illustrated in FIG. 1, the valve 68 allows fluid from the lines 66 to pass through the passageway 68a to the line 64, the valve solenoid 70 being energized at this time. This causes the piston 50 and the shaft 52 to move downwardly and holds the piston 50 at the lower end of the cylinder 46 as illustrated in FIG. 1. Fluid displaced from the cylinder 46 when the piston 50 moves downwardly exits therefrom through the line 62 and passes through the passageway 68b in the valve 68 to a discharge pipe 72. During such movement of the piston 50 and the shaft 52 the reaction arm 41 will be rotated in a counterclockwise direction. In this instance, for purposes of illustration, counterclockwise rotation of the shaft 33 and the valve stem 18 cause the valve 12 to open and vice versa.

If the rotational movement of the reaction arm 41 is to be reversed the valve solenoid 70 is de-energized whereby the valve 68 is rotated so that lines 66 and 62 communicate through passageway 68a and lines 64 and 72 communicate through passageway 68b. In this manner fluid passes from the line 66 to the line 62 into the reaction cylinder 46 and causes the piston 50 and shaft 52 to move upwardly in the cylinder 46. Fluid displaced from the upper end of the reaction cylinder 46 exists through line 64 and passes through the passageway 68b to the discharge line 72.

When the piston 50 and shaft 52 move upwardly they rotate the reaction arm 41 in a clockwise direction. As will be more apparent hereinafter this clockwise rotation of the reaction arm 41 rotates the shaft 33 and the stem 18 in a clockwise direction to close the valve 12.

In accordance with the present invention the valve operator 10 closes the valve 12 in two stages, the initial closing stage and the final closing stage, and opens the valve 12 in two stages, the initial opening stage and the final opening stage. The valve 12 is shown in FIG. 1 in its fully open position. The initial closing stage is initiated by turning on the gear motor 27 by actuation of the electric motor 26. In this manner, through the gear box 28, the electric motor 26 drives the drive shaft 30 in counterclockwise direction. During this stage the yoke member 40 in the differential gear unit 29 is stationary. Accordingly, counterclockwise rotation of the shaft 30 and its associated bevel gear 36a causes the spider bevel gears 36b and 36c to rotate in opposite directions thereby causing the bevel gear 36d to rotate in a clockwise direction at, in this instance, the same speed as the bevel gear 36a. Rotation of the bevel gear 36d causes the driven shaft 33 to also rotate in a clockwise direction, which clockwise rotation is transmitted through the coupling 33a to the valve stem 18. Clockwise rotation of the valve stem 18 causes the valve disc 20 to move toward the valve seat 22.

Assuming, for instance, that it takes eighteen revolutions of the valve stem 18 for the valve disc 20 to seat on the valve seat 22, the gear motor 27 operates until the valve stem 18 has completed about 17¾ revolutions. At this point the electric motor 26 automatically shuts off, which terminates the initial closing stage. The gear motor 27 has brake means discussed hereinbefore to prevent, in this instance, over travel of the drive shaft 30 of the gear motor 27. Accordingly, upon shutting off the electric motor 26 the drive shaft 30 stops immediately and is locked in place.

Simultaneously with shutting off the electric motor 26 the valve solenoid 70 is de-energized whereby the valve 68 is rotated in the manner described hereinbefore and fluid from the line 66 passes through passageway 68a to line 62 from which it enters the cylinder 46 to move the piston 50 upwardly. This upward movement of the piston 50 causes clockwise rotation of the reaction arm 41 and the yoke member 40. As the shaft 30 is locked in place, the bevel gear 36a is stationary and, accordingly, clockwise rotation of the yoke member 40 causes the spider bevel gears 36b and 36c to walk around the bevel gear 36a and rotate the bevel gear 36d and the shaft 33, to which it is fixedly attached, in a clockwise direction. Such clockwise rotation is transmitted to the valve stem 18 and continues until the valve disc 20 seats firmly upon the valve seat 22. The pressure at which the valve disc 20 is seated upon the valve seat 22 is controlled by the pressure exerted by the piston 50 in the reaction cylinder 46 and may be any predetermined value depending upon the desired conditions by controlling the fluid pressure in the line 66. The final closing stage terminates when the valve disc 20 is firmly seated upon the valve seat 22. The valve operator 10 therefore assures that the valve 12 is closed regardless of the wear upon the valve disc 20 or the valve seat 22 and positively holds the valve 12 in the closed position by the pneumatic pressure on the piston 50 in the reaction cylinder 46.

The initial opening stage is initiated by causing counterclockwise rotation of the reaction arm 41 while simultaneously energizing the electric motor 26 to drive the drive shaft 30 in a clockwise direction. To these ends the valve solenoid 70 is energized causing the valve 68 to rotate until the line 66 communicates with the line 64 through passageway 68a. Pressurized fluid passes through line 64 to the reaction cylinder 46 and forces the piston 50 downwardly to the position shown in FIG. 1. Fluid displaced from the bottom of the reaction cylinder 46 exits through line 62, passageway 68b and discharge line 72. Assuming that the torque supplied by the gear motor 27 is not sufficient to open the valve 12 the fluid pressure applied to the piston 50 must be large enough to create sufficient torque to open the valve 12. Accordingly, the fluid pressure must be sufficiently great so that the reaction arm 41 and yoke member 40 will be rotated in a counterclockwise direction causing the spider bevel gears 36b and 36c to walk on the gear 36a and cause counterclockwise rotation of the driven shaft 33 and the valve stem 18. The piston 50 and reaction arm 41 return to the position shown in FIG. 1. Once the valve 12 has been opened the initial opening stage is completed. The final opening stage is completed by the gear motor 27 which continues to rotate the shaft 30 in a clockwise direction and the shaft 33 and the valve stem 18 in a counterclockwise direction until the valve 12 has reached its full open position.

The selection of suitable control means to effect the sequence of operation discussed hereinabove would, of course, be within the ordinary skill of one in the art and therefore need not be discussed herein. Suffice it to say that there are a myriad of possible automatic and semi-automatic control means that may be used for this purpose.

In certain instances it may be required to have one pressure to close the valve and a higher pressure to open the valve. For example, there may be situations where once the valve disc has been seated upon the valve seat additional pressure will be necessary to open the valve. In such instances suitable means may be employed to provide one fluid pressure for holding the valve in its closed position and a higher fluid pressure for opening the valve.

If, on the other hand, the gear motor 27 can provide sufficient torque to open the valve 12 it is unnecessary to employ the line 64 and the complex type of valve 68 illustrated in FIG. 1. Instead the upper end of the reaction cylinder 46 may be vented to permit upward movement of the piston 50 in the manner described hereinbefore. Upon energizing the gear motor 27 to open the valve the yoke member 40 would be rotated in a counterclockwise direction until the piston 50 reaches the position shown in FIG. 1. Once the yoke member 40 was stationary the rotary motion of the drive shaft 30 would then be transmitted through the differential gear unit 29 to the driven shaft 33 and the valve stem 18 whereby the valve disc 20 would move away from the vale seat 22.

Figure 3:
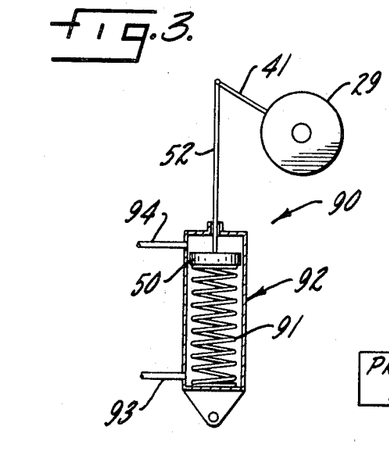
FIG. 3 is a fragmentary schematic view of a modified valve operator embodying the features of the present invention.

Referring now to FIG. 3 there is illustrated schematically a modified valve operater 99 embodying the features of the present invention. With the exception in its reaction cylinder 92, the valve operator 90 is structurally the same as the valve operator 10 discussed hereinbefore. The reaction cylinder 92 has the reciprocal piston 50 therein connected to the piston shaft 52 which extends outwardly of one end of the cylinder. As described hereinbefore the shaft 52 has a yoke 56 attached thereto (see FIG. 1) which is pivotally attached to the reaction arm 41. The other end of the reaction cylinder 92 has a yoke 55 attached thereto which is pivotally secured to a support member 54 on the frame 32 (see FIG 1). In this manner as the piston 50 and shaft 52 move the cylinder 46 may pivot about the pivotal attachment between the yoke 55 and the support member 54.

The reaction cylinder 92 has therein a spring 91 which urges the piston 50 upwardly to the position shown in FIG. 3. The bottom end of the reaction cylinder 92 has a vent 93 and the upper end of the reaction cylinder 92 has a vent 94. These vents permit air to flow into and out of the cylinder 92 as the piston 50 moves.

The operation of the valve operator 90 is generally similar to the valve operator 10 described hereinbefore. Upon actuation of the gear motor 27 the drive shaft 30 is rotated in a counterclockwise direction and through the differential gear 29 the valve stem 18 is rotated in a clockwise direction causing the valve disc 20 to move toward the valve seat 22. Assuming, for example, that it takes approximately 18 revolutions of the drive shaft 30 to seat the valve disc 20 on the valve seat 22 the gear motor 27 is set to operate until there has been slightly more than 18 revolutions of the drive shaft 30. When the valve disc 20 contacts the valve seat 22 further rotation of the valve stem 18 will, of course, increase the pressure between the valve disc 20 and the valve seat 22. The valve operator 90 controls the amount of pressure between the valve disc 20 and the valve seat 22.

The gear motor 27 continues to operate after the valve disc 20 contacts the valve seat 22. Accordingly, the pressure between the valve disc 20 and the valve seat 22 will build up until the torque being transmitted through the yoke member 40 is sufficiently large that the force exerted upon the spring 91 by the piston 50 causes the spring 91 to be compressed. When this occurs the piston 50 moves downwardly permitting counterclockwise rotation of the reaction arm 41 and the yoke member 40. Thus the rotation of the drive shaft 30 is in effect taken up by the counterclockwise rotation of the yoke 40. In other words, once the pressure between the valve disc 20 and the valve seat 22 reaches a predetermined point further rotation of the drive shaft 30 merely causes counterclockwise rotation of the yoke member 40 rather than increased pressure between the valve disc 20 and the valve seat 22. In this manner, the over-travel of the valve stem 18 is compensated for by the valve operator 90 and, more particularly, the reaction cylinder 92 and a controlled predetermined pressure between the valve disc 20 and the valve seat 22 is achieved by compression of the spring 91

The valve is opened by energizing the gear motor 27 whereby clockwise rotation of the drive shaft 30 is effected. The gear motor 27 is, of course, set to give a predetermined number of clockwise revolutions of the drive shaft 30. Upon energizing the gear motor 27 the yoke member 40 will first be rotated in a clockwise direction until the piston 50 has moved to the top end of the reaction cylinder 92. Movement of the piston 50 toward the top of the reaction cylinder 92 will, of course, be accelerated by the spring 91 releasing its stored energy. Once the piston 50 has reached the position shown in FIG. 3 further clockwise rotation of the draft shaft 30 will cause counterclockwise rotation of the valve stem 18 and the valve disc 20 to move away from the valve seat 22 and thereby open the valve 12. The opening stage of the valve 12 is completed upon the gear motor 27 completing the predetermined number of revolutions for the drive shaft 30.

Figure 4:
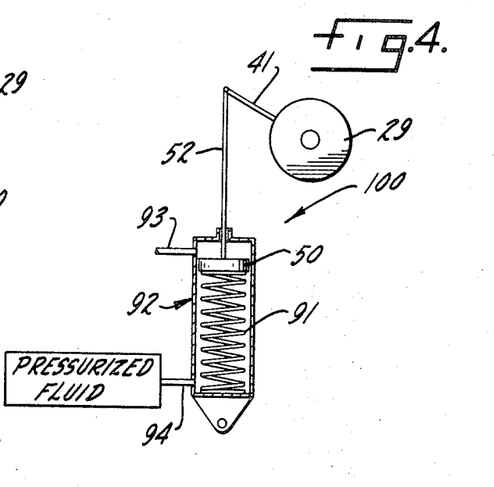
FIG. 4 is a fragmentary schematic view of a further modified valve operator embodying the features of the present invention.

Referring now to FIG. 4 there is illustrated schematically a modified valve operator 100 embodying the features of the present invention. The valve operator 100 is substantially the same as the valve operator 90 discussed hereinbefore. In this instance, however, the vent 94 is connected to a source of pressurized fluid, such as air or liquid. With the spring 91 this pressurized fluid exerts a force against the piston 50 urging it toward the top of the reaction cylinder 92. It is the cumulative force of the pressurized fluid and the spring 91 which must be overcome if the piston 50 is to move toward the lower end of the reaction cylinder 92 and thereby permit clockwise rotation of the yoke member 40 to prevent the pressure between the valve disc 20 and the valve seat 22 from exceeding a predetermined value. The energy stored in the reaction cylinder 92 during the final closing stage is, of course, released in the initial stage of valve opening. In all other respects the structure and operation of the valve operator 100 is the same as the valve operator 90 discussed hereinbefore.

Figure 5:
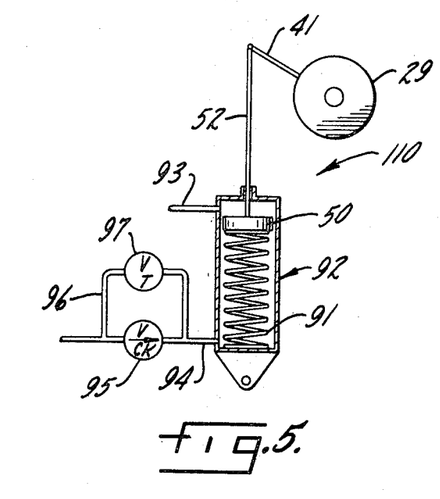
FIG. 5 is a fragmentary schematic view of another modified valve operator embodying the features of the present invention.

Referring now to FIG. 5 there is illustrated schematically a modified valve operator 110 embodying the features of the present invention. The valve operator 110 is substantially the same in structure and operation as the valve operator 90 described hereinbefore. The only difference in structure and operation relates to the dampening means associated with the vent 94. To these ends the vent 94 has a check valve 95 therein which permits the flow of air into the reaction cylinder 92 but precludes the flow of air from the reaction cylinder 92 through the vent 94. A by-pass passageway 96 communicates with the vent 94 on opposite sides of the check valve 95. The by-pass passageway 96 has a flow restricter valve 97 therein. In operation therefore as the piston 50 is moving downwardly by virtue of the torque being created upon the yoke member 40 such movement is dampened since the air being forced from the reaction cylinder 92 must pass through the flow restricter valve 97. This valve may be adjusted to give any desired dampening effect. On the other hand, when the piston 50 is moving toward the top end of the reaction cylinder 92 air may freely enter through line 94 and the one-way check valve 95.

Figure 6:
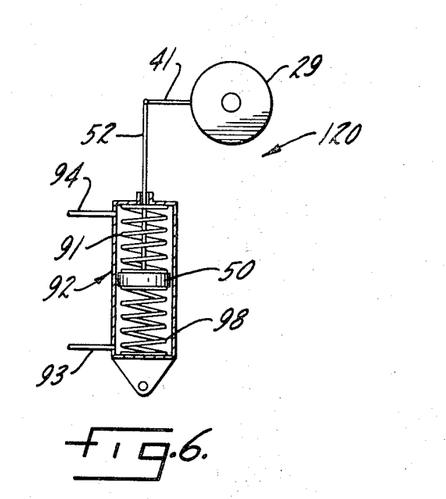
FIG. 6 is a fragmentary schematic view of still another valve operator embodying the features of the present invention.

Referring now to FIG. 6 there is illustrated another modified valve operator 120 embodying the features of the present invention. The valve operator 120 is substantially the same in structure and operation as the valve operator 90 described hereinbefore. There is, however, an opposing spring 98 acting upon the piston 50, so that cushioning is provided when the valve moves to the fully opened position as well as when the valve is fully closed. Once the valve has reached its fully opened position any over-travel of the motor or the like will be compensated for by the spring 98. The vents 93 and/or 94 may also be connected to sources of pressurized fluid (not shown). In this manner, varying the pressure on the sides of the piston 50 will move the valve disc 20 toward or away from the valve seat 22 and therefore control the position of the valve disc 20 with respect to the valve seat 22. This mode of operation may be employed for extremely fine positioning of the valve disc 20 at a plurality of positions intermediate the open and close positions after the gear motor 27 has been used to roughly position the valve disc 20.

Figure 7:
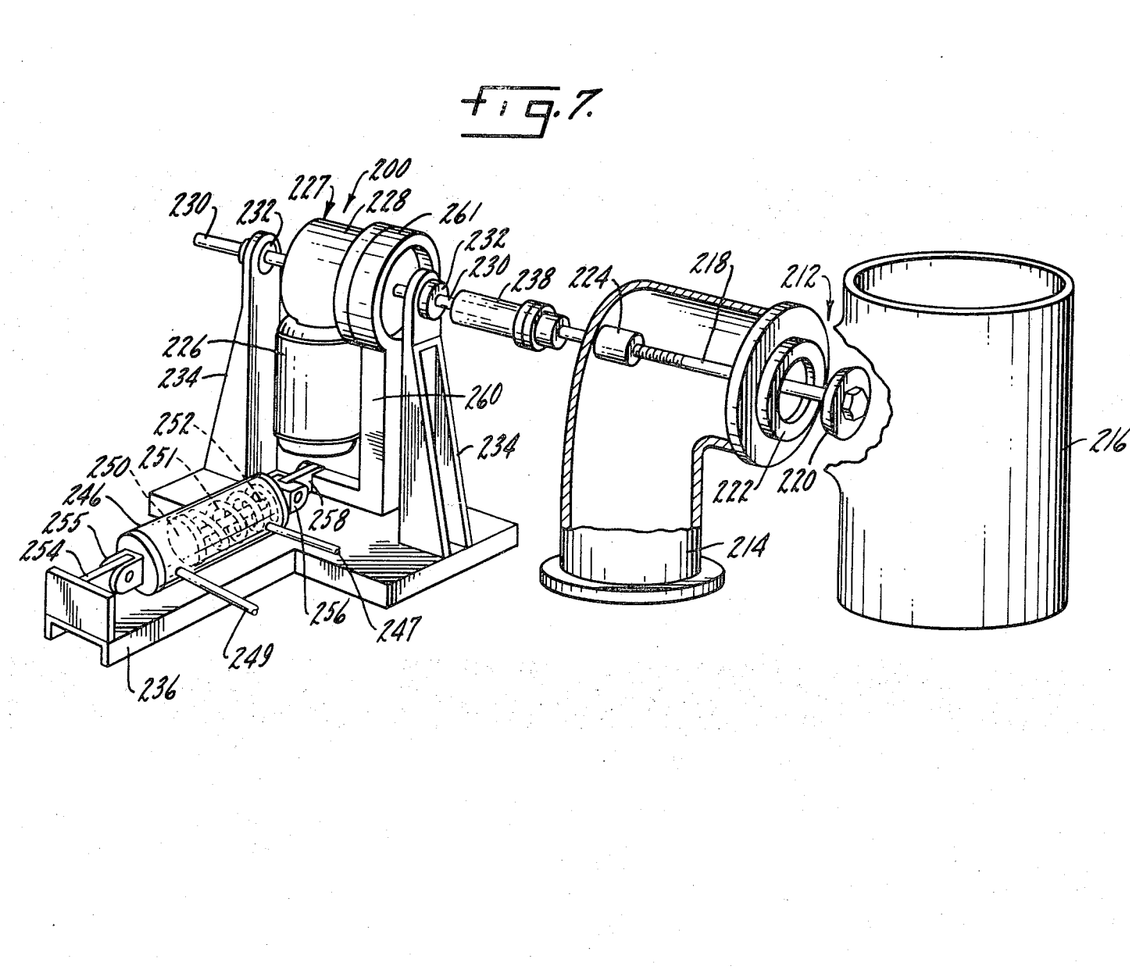
FIG. 7 is a perspective view of another valve operator embodying the features of the present invention.

Referring to FIG. 7, a modified electro-pneumatic valve operator embodying the features of the present invention is indicated generally be reference numeral 200. As shown in FIG. 7, the valve operator 200 is to effect the opening and closing of a valve 212 in a branch pipe 214 from a main pipe 216. To these ends the valve operator 200 is connected to a valve stem 218 of the valve 212. A valve disc 220 attached to a free end of the valve stem 218 cooperates with a valve seat 222 to allow or prevent flow through the pipe 214 to or from the pipe 216. A collar 224 is secured to the pipe 214, the valve stem 218 threadably engaging the collar 224 whereby rotation of the stem 218 moves the valve disc 220 toward or away from the valve seat 222 to open or close the valve 212.

The electro-pneumatic valve operator 200 includes a gear motor indicated generally by reference numeral 227. The selection of a suitable gear motor 227 would be within the ordinary skill of one in the art. In this instance, however, the gear motor 227 comprises a three-phase alternating current motor 226, a gear box 228 and a drive shaft 230 extending from both ends of the gear box 228 and is a right-angle gear motor of the type manufactured and sold by Master Electric Company and illustrated in their Consolidated Price List (Data 56, dated June 1955) entitled "Gearmotors—Right Angle Shaft Type." Such gear motors, as is well known in the art, employ worm gearing in the gear box 228 whereby the drive shaft 230 is "self-locking," i.e., the drive shaft 230 may drive the valve stem 218, but the valve stem 218 may not be used to rotate the drive shaft 230. Therefore the drive shaft 230 of the gear motor 227 does not rotate unless driven by the electric motor 226 through the gear box 228.

The electric motor 226 has braking means (not shown), as will be readily appreciated by one with ordinary skill in the art. The brake means is of the type employed on the "Unibrake Motor" manufactured and sold by the Master Electric Company and described and illustrated in their Consolidated Price List (Data 53, dated June 1955) entitled "Unibrake Motors." This type of brake means is further illustrated, with a parts list, in Master Electric Company's File Parts Catalogue, "Parts List for Single Disc Unibrake-Open Ventilated Type," pp. 1–3, dated Jan. 2, 1957. The gear box 228 and alternating current motor 226 cooperate to drive the shaft 230.

The gear motor 227 is suspendedly supported by the shaft 230 which extends through self-alignment bearings 232 mounted in vertical support columns 234 of a frame 236. A coupling 238 fixedly secures the valve stem 218 to the drive shaft 230 whereby rotation of the drive shaft 230 will rotate the valve stem 218 in the same direction the same number of revolutions. It will be understood that the shaft 230 does not move axially, but the valve stem 218 is permitted to do so upon rotation.

A reaction cylinder 246 has a reciprocal piston 250 therein connected to a piston shaft 252 which extends outwardly of one end of the cylinder 246. The ends of the cylinder 246 have vents 247 and 249 so that air may pass in and out of the cylinder 246 as the piston 250 moves therein. The piston 250 is biased toward the position shown in FIG. 7 by a spring 251. The shaft 252 has a yoke 256 attached thereto which is pivotally attached to a link 258 fixedly secured to a reaction arm 260. The other end of the reaction cylinder 246 has a yoke 255 attached thereto which is pivotally secured to a support member 254 on the frame 236. In this manner as the piston 250 and shaft 252 move the cylinder 246 will pivot about the pivotal attachment between the yoke 255 and the support member 254.

The reaction arm 260 has a hub 261 which is secured by a suitable means (not shown) to the gear box 228, of the gear motor 227. The reaction arm 260 is rotatable about the axis of the shaft 230 with the entire gear motor 227 by virtue of the attachment between the hub 261 and the gear box 228.

The valve 212 is shown in FIG. 7 in its fully open position. To close the valve 212 the gear motor 227 is turned on by actuation of the electric motor 226. In this manner through the gear box 228, the electric motor 226 drives the shaft 230 and the valve stem 218 in a clockwise direction causing the valve disc 220 to move toward the valve seat 222. Assuming, for instance, that it takes 18 revolutions of the valve stem 218 for the valve disc 220 to seat on the valve seat 222, the gear motor 227 is set to operate until approximately 18¼ revolutions of the drive shaft 230 and the valve stem 218 have been achieved. After the valve stem 218 has rotated approximately 18 revolutions the valve disc 220 will seat upon the valve seat 222. Further rotation of the valve stem 218 causes the valve disc 220 to assert additional pressure against the valve seat 222.

In accordance with the present invention the pressure at which the valve disc 220 is maintained against the valve seat 222 is controlled through the reaction arm 260. This is effected in the following manner. Further rotation of the valve stem 218 would cause additional pressure to be exerted by the valve disc 220 on the valve seat 222. This pressure is, however, controlled by the spring 251. Once a predetermined pressure has been reached between the valve disc 220 and the valve seat 222 the spring 251 will give way permitting the reaction arm 260 and gear motor 227 to rotate in a counterclockwise direction to absorb the extra ¼ turn of the drive shaft 230. This rotation continues until the gear motor 227 stops. When the gear motor 227 and the reaction arm 260 rotate it will be understood that no additional force except the spring rate compression force is created between the valve disc 220 and the valve seat 222 which is the reactive clockwise holding force.

The valve is opened by energizing the gear motor 227 to cause the drive shaft 230 to rotate in a counterclockwise direction. Immediately upon energizing the gear motor 227 the spring 251 will cause the reaction arm 260 and the gear motor 227 to rotate in a clockwise direction to help accelerate the motor 226 back to the position shown in FIG. 7 and this high acceleration gives the force required for break-out of the valve disc 220 from the valve seat 222. The motor will continue to operate until the valve disc 220 has been moved away from the valve seat 222 to the position shown in FIG. 7 from which the closing operation beigns.

The reaction cylinder 92 illustrated in FIGS. 4, 5, and 6 may be substituted for the reaction cylinder 246 with attendant differences in versatility of operation discussed hereinbefore.

Figures 8, 10:
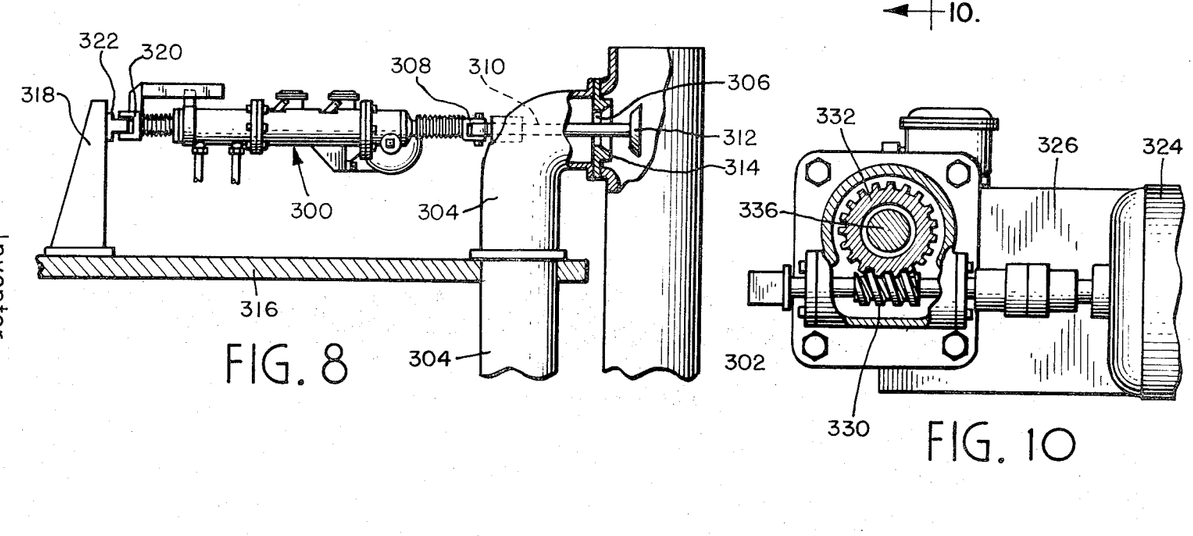
FIG. 8 is a perspective view of yet an additional embodiment of the present invention.
FIG. 10 is a cross-sectional view taken along lines 10—10 of FIG. 9.

Referring now to FIG. 8, the valve operator of the invention there illustrated is generally denoted by the reference numeral 300. Like the earlier embodiments described herein, the valve operator 300 is adapted to control movement of a valve means which regulates fluid flow between a primary flow conduit 302 and a subsidiary conduit 304 that is interconnected to the primary conduit through a valve passageway 306. To this end, the valve operator 300 is pivotally connected by a clevis 308 to one end of a valve stem 310 of the valve means. The stem 310 extends through a dynamic packing or sealing gland into the subsidiary conduit 304 and carries at its opposite end a valve member 312 that is adapted to be displaced from its illustrated fully open position to a closed position in which the valve member is in firm engagement with a valve seat 314 thereby to block the valve passageway 306.

It is to be understood that the valve stem 310 is confined to movement in an axial direction and the conventional internal constructions of the valve (not shown) prevent rotation of the stem 310. Furthermore, the particular valve means illustrated is merely exemplary and the valve means may alternatively be a plug valve, gate valve, etc.

The structural support for mounting the valve operator mechanism 300 is an appropriate position relative to the flow conduits is schematically illustrated in the drawing as comprising a vertical frame member 316 to which there is affixed a horizontally extending pedestal 318. A clevis 320 at the lower end of the operator 300 is pivotally connected to a T-bracket 322 that is secured to the top surface of the pedestal 318.

Figure 9:
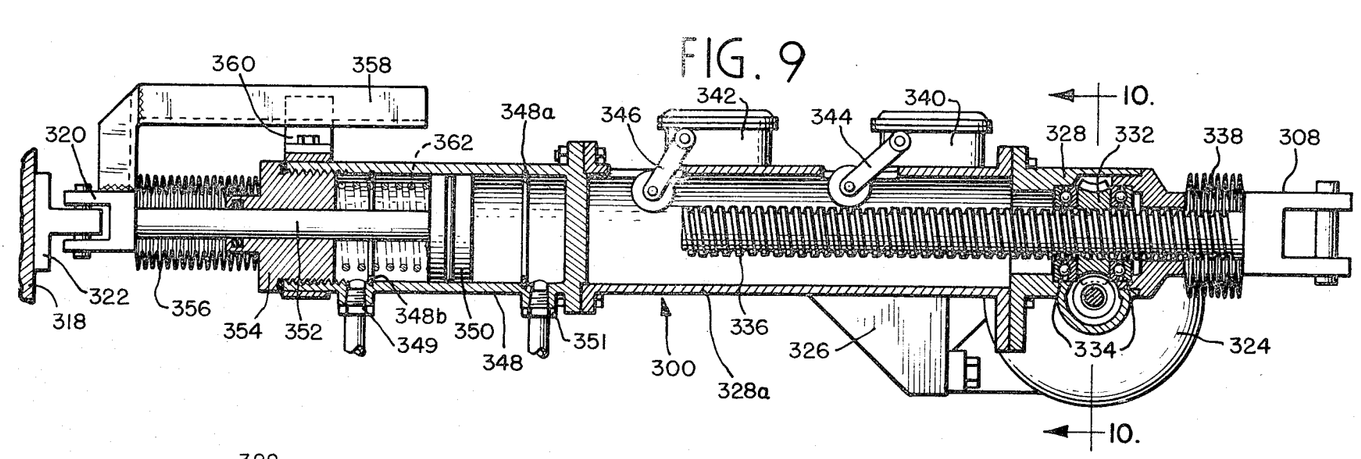
FIG. 9 is an enlarged, sectional view of the valve operator mechanism of FIG. 8.

The construction of the valve operator 300 can be appreciated in greater detail by reference to FIGS. 9 and 10. Specifically, the operator 300 includes a motor means comprising a bi-directional electric motor 324 of conventional design that may be identical to the commercial form earlier identified herein. The motor 324 is mounted on a platform 326 that extends horizontally from a vertical support sleeve 328a of the valve operator mechanism 300. The motor 324 is provided with a self-locking drive shaft arrangement formed by meshing of a worm 330 carried on the rotating shaft of the motor 324 and a worm gear 332. Thus, rotation of the worm 330 rotates the worm gear 332 but the worm gear 332 cannot rotate the worm 330.

The worm gear 332 is supported within the vertical support sleeve 328 intermediate a pair of annular bearings jointly identified by the numeral 334. A threaded shaft 336 is centrally journalled within the internally threaded worm 332, the shaft 336 being axially displaced either up or down depending upon the direction of rotation of the worm 332. Of course, the valve member 312 moves in correspondence with the movement of the threaded shaft 336. An expandable, protective boot 338 surrounds the threaded shaft 336 intermediate the underside of the clevis 308 and the top portion of the sleeve 328 to prevent dirt or other foreign materials from fouling the threads of the shaft.

The bi-directional motor 324 is controlled by a conventional electrical control means of the automatic or manual type and, in accordance with one mode of operation, is adapted to be automatically de-energized when the valve member 312 is displaced from an initial position to its fully open position or a second position immediately adjacent its valve seat. To this end, a pair of conventional limit switches 340 and 342 are mounted in predetermined vertically spaced positions along a lower section 328a of the support sleeve 328. The limit switches 340 and 342 include respective actuating arms 344, 346 that extend through associated apertures in the sleeve section 328a to positions that lie within the path of movement of the threaded shaft 336. In FIG. 9, the actuating arm 344 has been displaced in a clockwise direction by the shaft 336 while the actuating arm 346 remains in its normal or unactuated position.

The limit switches 340 and 342 are connected to the motor 324 by conventional control circuitry such that as the threaded shaft 336 reaches an uppermost position permitting the actuating arm 344 to return to its normal position, the motor 324 is de-energized. On return movement of the shaft 336 the limit switch 340 has no effect while clockwise displacement of the actuating arm 346 by the shaft 336 again stops the motor but in this instance the valve member 312 is positioned immediately adjacent its associated valve seat.

The valve operator 300 also includes a closed cylinder 348 having a peripheral flange at its upper end bolted to a mating flange at the base of the sleeve section 328a. A piston 350 is supported within the cylinder 348 and is provided with a reaction arm means or piston rod 352 that extends through a central bearing of a lower closure plug 354 for the cylinder 350. The piston rod 352 is affixed at its lower end to the clevis 320. An expandable, protective boot 356 surrounds the lower end of the piston rod 352 that extends below the plug 354.

The cylinder 348 is provided with a pair of control ports adjacent the lower and upper ends, respectively, of the cylinder. As will presently be explained in greater detail, the control ports may be connected by pressure lines to a hydraulic or pneumatic pressure system, such as described in connection with FIG. 1, or alternatively one or both of the ports may be vented, directly or through a flow restricter, to the atmosphere. As will be understood by those skilled in the art, the particular arrangement is a function of the operating characteristics desired for the valve operator. The cylinder 348 is also provided with a pair of internal, annular shoulders 348a and 348b adjacent its upper and lower ends to limit travel of the piston relative to the cylinder so that the flow ports 349 and 351 are not blocked by the piston 350 during the course of its movement relative to the cylinder. The piston 350 normally rests against the upper shoulder 348a due to the weight of the valve operator, but in the illustration of FIG. 8 it is assumed that a positive pressure exists above the piston causing it to occupy the illustrated intermediate position within the cylinder. Since the piston 350 is rigidly affixed to the base 318 through the piston rod 352, clevis 320 and T-bracket 322, it will be understood that the cylinder 348 in fact moves relative to the fixed piston and effects a corresponding vertical displacement of the entire valve operator structure.

In order to preclude rotation of the sleeve structure 328, 328a and the integrally affixed cylinder 348, there is provided an anti-rotation guide comprising a vertically slotted guide arm 358 that is attached at its lower end to the clevis 320. An indexing tab 360 extending laterally from the lower end of the cylinder 348 is confined to travel in the slot of the guide 358 thus precluding rotation of the sleeve structure relative to the base 318.

In operation, the present embodiment is capable of functioning with the full versatility and in all of the various operating modes of the earlier described embodiments. In this regard, the present embodiment may be modified in similar fashion to the embodiment of FIG. 1 as variously depicted in FIGS. 3–6 to obtain corresponding operating characteristics. More particularly, the piston and cylinder arrangement 348, 350 or equivalent means may be utilized as an auxiliary motor means to effect a final seating and initial unseating of the valve member or as a resilient energy storage means to cushion the impact between the valve member and seat and thereby preclude damage to either of these members and particularly to avoid damage in the event that an obstruction is encountered during attempted seating of the valve.

Specifically, and with reference to explaining the operation of the piston and cylinder arrangement 348, 350 as an auxiliary motor means, it is assumed that the valve member 312 was initially in its fully opened position as depicted in FIG. 8 and that the motor 324 has been actuated to initiate downward movement of the threaded stem 336 moving the valve member 312 towards the valve seat 314. As the threaded stem 336 continues on its downward path of movement as shown in FIG. 9 it will intercept the actuating arm 346 of the limit switch 342 to de-energize the motor 324, the valve member 312 being at this point positioned immediately adjacent the seat 314. A fluid, such as air or oil, is now introduced under a predetermined pressure through the cylinder port 349 while the fluid occupying the space above the piston 350 is bled off through the upper cylinder port 351. As previously stated, the fluid control means for performing this function may be substantially identical to that structure previously described in connection with FIG. 1.

When the valve seating pressure equals the fluid pressure beneath the piston 350 downward movement of the cylinder ceases and an equilibrium is established with the valve firmly seated at a pressure corresponding to the fluid pressure beneath piston 350. Unseating of the valve is accomplished in a converse fashion, namely, by introducing a pressurized fluid into the upper cylinder port 351 while bleeding off the pressurized fluid at the lower port 349 thus returning the piston toward its normal position near the center of the cylinder 348. The electric motor 324 may be actuated concurrently with the auxiliary motor means or alternatively may be energized subsequent to an initial "breakout" of the valve from its seat.

According to another mode of operation of the present embodiment, the limit switch 342 for halting the motor 324 prior to engagement of the valve member 312 with the valve seat 314 is omitted or disconnected and the cylinder arrangement 348, 350 is utilized as a means for absorbing and storing a predetermined portion of the energy developed upon impact of the valve member 312 and the seat 314. The control ports 349, 351 in this arrangement may be vented to the atmosphere.

Specifically, according to this mode of operation, there is provided a resilient energy storage means within the cylinder, such as the spring 362 denoted in dotted outline in FIG. 9. The operation of this variant of the present embodiment is similar to that described above excepting that the motor 324 is no longer stopped prior to the valve member 312 impacting against its seat 314; on the contrary, the motor continues to drive the threaded shaft 336 as the valve member impacts the seat thereby effecting a compression of the spring 362 until the reaction forces between the motor, the seated valve member, and the spring 362 are equal. If the motor is now stopped, the valve 312 is maintained in engagement with its seat 314 with a force equal to that exerted by the compressed spring 362 since the motor drive shaft is of the self-locking type. In practice, it is most convenient to shift the limit switch 342 downwardly relative to the mounting sleeve 328a such that the motor 324 is automatically de-energized as the motor approaches impact with the valve seat; the inertia of the rotating motor drive shaft causes a seating of the valve member and compression of the spring 362. Of course, the limit switches 340, 342 may both be omitted if a torque motor, i.e., a motor that automatically stalls on encountering a predetermined resistive torque, is employed in place of the motor 324.

The compressed spring or energy storage means 362 also assists in unseating of the valve 312. Specifically, as the motor 324 is energized, the resultant initial upward movement of the threaded stem 336 does not operate to force the valve from its seat but rather permits the stored energy to be released from the spring 362 which in turn relieves the seating pressure from the valve member 312 without in fact displacing this valve member. Since the spring 362 is assisting rather than opposing the action of the motor 324, the motor 324 accelerates with little or no effective loading and is essentially at full speed prior to encountering the resistance of the seated valve. Such an arrangement is particularly useful in unseating sticky or frozen valves.

In those instances where values are particularly difficult to unseat, a hydraulic fluid may be introduced through the upper cylinder port 351 to urge the operator mechanism upward relative to the fixed piston 350 thus providing an auxiliary force for unseating the valve member. Also, to supplement the influence of the spring 362 in cushioning the impact of the valve 312 against its seat 314, there may be coupled to the cylinder port 349 the parallel combination of a check valve and a flow restrictor orifice arrangement to operate in the same manner as that explained in connection with the arrangement of FIG. 5. Backseating of the valve member likewise may be cushioned by employing the resilient bias means or spring on the side of the piston 350 opposite that of spring 362; a similar modification of the embodiment of FIG. 1 is explained in connection with FIG. 6.

While the embodiments described herein are at present considered to be preferred, it will be understood that various modifications and improvements may be made therein and it is intended to cover in the appended claims all such modifications and improvements as fall within the true spirit and scope of the invention.

What is claimed is:

1. A valve operator for a valve having a rotatable valve stem which comprises primary motor means having a self-locking drive shaft, a differential gear means connecting said drive shaft to said valve stem, said differential gear means having second gear means through which torque is transcmitted from said drive shaft to said valve stem, supporting means for said second gear means, and auxiliary motor means to control movement of said supporting means so that said valve stem may be moved relative to said drive shaft for effecting a final seating and an initial unseating of said valve, said auxiliary motor means to control movement of said supporting means comprising a cylinder having a piston therein, a piston shaft connecting said piston to said supporting means, and spring means in said cylinder opposing movement of said piston for normally urging said piston toward one end of said cylinder, the opposite end of said cylinder being connected to a source of pressurized fluid.

2. The valve operator of claim 1 wherein said spring means urges said piston toward one end of said cylinder, said end of said cylinder communicating with a vent having a one-way valve means therein, said vent having a by-pass line with a restricter valve therein, said by-pass line communicating with said vent on opposite sides of said valve means, said valve means preventing the flow of fluid from said cylinder through said vent and permitting the flow of fluid into said cylinder through said vent.

3. A valve operator for a valve having a rotatable valve stem which comprises a rotatably mounted motor means to rotate said stem, means attached to said motor means to resist rotation of said motor means, said motor means having a self-locking drive shaft, said means to resist rotation of said motor means comprises a reaction arm attached to said motor means, said motor means being rotatable about its drive shaft, said reaction arm being connected to a piston in a cylinder, movement of said piston in said cylinder being opposed by a spring means in said cylinder.

4. A valve operator comprising:
  valve means including a valve member affixed to an axially movable stem and a seat for said valve member;
  a differential gear unit including first gear means, second gear means meshing with said first gear means, a yoke member supporting said second gear means and being rotatable about the axis of said first gear means, third gear means mounted upon a driven shaft of said differential gear unit and meshing with said second gear means;
  primary motor means including a self-locking drive shaft connected to drive said first gear means, said primary motor means being adapted to rotate said valve stem for axially shifting said valve stem and associated valve member between a first, fully opened position in which said valve member is spaced a predetermined substantial distance from said valve seat and a second position in which said valve member is immediately adjacent said valve seat;
  control means responsive to the axial position of said valve means for de-energizing said primary motor means at each of said first and second positions; and
  auxiliary motor means comprising a fluid motor connected to rotate said yoke member in a first angular direction for displacing said valve member from said second position into engagement with said seat under a predetermined seating pressure and for rotating said yoke member in a second, opposite angular direction for providing an auxiliary force for unseating said valve member.

5. The valve operator of claim 4 wherein said auxiliary motor means for controlling the rotation of said yoke member comprises a cylinder having a piston therein, a piston shaft connecting said piston to said yoke member, and means for selectively introducing pressurized fluid into said cylinder to move said piston and thereby rotate said yoke member.

6. The valve operator of claim 4 wherein said auxiliary motor means for controlling the rotation of said yoke member comprises a cylinder having a first end and a second end, said first end and said second end being connected to sources of pressurized fluid, a piston in said cylinder, said piston having a piston shaft connecting said piston to said yoke member.

7. A valve operator comprising:
  valve means including a valve member affixed to an axially movable stem and a seat for said valve member;
  primary motor means, including a self-locking drive shaft coupling said motor means to said valve stem, for axially shifting said valve member between a first position in which said valve member is spaced a predetermined substantial distance from said valve seat and a second position in which said valve member is immediately adjacent said valve seat;
  control means comprising spaced limit switches responsive to the axial position of said valve means for deenergizing said primary motor means at each of said first and second positions;
  auxiliary motor means including a cylinder supported in axial alignment with said valve stem, a piston within said cylinder and means for introducing a fluid into said cylinder at a predetermined control pressure, said auxiliary motor means being constructed and arranged for displacing said valve member in proportion to the displacement of said piston within said cylinder for moving said valve member from said second position into firm engagement with said valve seat and for at least assisting said primary motor means in unseating said valve member.

References Cited

UNITED STATES PATENTS

| | | | |
|---|---|---|---|
| 1,708,958 | 4/1929 | Schmidt | 251—134 X |
| 2,028,696 | 1/1936 | Beckwith | 251—130 |
| 2,357,502 | 9/1944 | Chilton | 251—58 X |
| 2,584,847 | 2/1952 | Dahl | 251—14 X |
| 2,660,072 | 11/1953 | Veenschoten | 74—625 |
| 2,902,885 | 9/1959 | Wright | 251—14 X |
| 3,198,034 | 8/1965 | De Witte et al. | 74—625 |

FOREIGN PATENTS

| | | |
|---|---|---|
| 42,666 | 7/1930 | Denmark. |
| 1,132,099 | 10/1956 | France. |

M. CARY NELSON, Primary Examiner

M. O. STURM, Assistant Examiner

U.S. Cl. X.R.

251—58, 130, 134